(12) United States Patent
Park

(10) Patent No.: US 8,490,441 B2
(45) Date of Patent: Jul. 23, 2013

(54) WASHING MACHINE

(75) Inventor: Yong Suck Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 886 days.

(21) Appl. No.: 12/299,203

(22) PCT Filed: May 2, 2006

(86) PCT No.: PCT/KR2006/001637
§ 371 (c)(1),
(2), (4) Date: Oct. 31, 2008

(87) PCT Pub. No.: WO2007/126171
PCT Pub. Date: Nov. 8, 2007

(65) Prior Publication Data
US 2009/0071201 A1    Mar. 19, 2009

(51) Int. Cl.
*D06F 37/26* (2006.01)
*D06F 21/02* (2006.01)

(52) U.S. Cl.
USPC ......................................... 68/142

(58) Field of Classification Search
USPC ........................................ 68/139, 142, 140
See application file for complete search history.

(56) References Cited

U.S. PATENT DOCUMENTS

| 5,262,105 | A  | * | 11/1993 | Komiyama et al. | 264/85 |
| 6,596,370 | B2 | * | 7/2003 | Hyuga et al. | 428/66.6 |
| 2002/0106473 | A1 | | 8/2002 | Hyuga et al. | 428/64.1 |
| 2004/0123633 | A1 | | 7/2004 | Jo | |

FOREIGN PATENT DOCUMENTS

| EP | 0 043 429 |   | 1/1982 |
| JP | 59081127 A | * | 5/1984 |
| JP | 07068086 A | * | 3/1995 |
| JP | 08113429 A | * | 5/1996 |
| KR | 10-2004-0033999 |   | 4/2004 |
| KR | 10-0504126 |   | 7/2005 |

OTHER PUBLICATIONS

Machine translation of JP 08113429 A, no date.*
Machine translation of JP 07-068086 A, no date.*
International Search Report dated Feb. 17, 2009.
Written Opinion of the International Searching Authority dated Feb. 17, 2009.
German Office Action dated Apr. 5, 2012 issued in Application No. 11 2006 003 878.8 (with English translation.).

* cited by examiner

*Primary Examiner* — Joseph L Perrin
(74) *Attorney, Agent, or Firm* — KED & Associates LLP

(57) ABSTRACT

A washing machine is provided that includes a tub having an open front side and a closed rear wall, and a drum rotatably mounted within the tub. A portion adjacent to a gate part, which allows resin to be injected in an injection-molding process of the rear wall of the tub, is thicker than other portions, thereby improving inflow of the resin.

6 Claims, 4 Drawing Sheets

WASHING MACHINE

TECHNICAL FIELD

The present invention relates to a washing machine, and more particularly, to a tub of a washing machine and a method for fabricating the same.

BACKGROUND ART

In general, a washing machine performs washing by rotating a drum having laundries therein through a driving force transmitted by a motor in a state where detergent and the laundry are mixedly loaded into a drum.

A drum washing machine which has been preferably used recently in the related art will be embodied as follows.

The drum washing machine is classified by a driving method into an indirect-motor-drive type and a direct-motor drive type. According to the indirect-motor-drive type washing machine, the driving force of motor is indirectly transmitted to a drum through a motor pulley and a belt wound around a drum pulley. According to the direct-motor-drive type drum washing machine, the driving fore of motor is directly transmitted to a drum, because a rotor of a BLDC motor is directly connected with the drum.

Referring to FIG. 1, a conventional direct-drive motor type drum washing machine will be schematically described.

FIG. 1 is a longitudinal sectional view illustrating a structure of a conventional drum washing machine. The conventional drum washing machine includes a cabinet 1 defining an exterior thereof, a tub 2 mounted within the cabinet 1 with a front side opened and a drum 3 rotatably mounted in an inner center of the tub 2.

Moreover, a motor 47 having a stator 6 and a rotor 5 are mounted in a rear wall of the tub 2. The stator 6 is secured to the rear wall of the tub 2, and the rotor 5 passes through the tub 2 surrounding the stator 6 and is connected with the drum 3 by a shaft 4.

Together with that, a tub supporter in the same appearance as an exterior of the rear wall of the tub 2 is provided between the rear wall of the tub 2 and the stator 6, and fastened to the rear wall of the tub 2 to support the load of the stator 6 when fastening the stator 6. Also, the tub supporter is made of metal to maintain the concentricity of the stator 6.

Meanwhile, a door 21 is coupled to a front side of the cabinet 1, and a gasket 22 is provided between the door 21 and the tub 2.

In addition, a hanging spring 23 is provided between an upper inner surface of the cabinet 1 and an upper circumferential surface of the tub 2 to support the tub 2. Also, a friction damper 24 is provided between an inner lower surface of the cabinet 1 and a lower portion of the outer circumferential surface of the tub 2 to dampen the vibration of tub 2 generated in spinning.

Referring to FIG. 2, a bearing housing 7 having a hollow 55 formed in a center thereof is inserted into the tub 2. The shaft 4 of the motor 47 passes through the hollow 55.

At that time, the bearing housing 7 is made of aluminum alloy and formed as one body with the rear wall of the tub 2 by being inserted into the rear wall of the tub 2 when injection-molding the tub 2 with plastic resin.

As shown in FIG. 2, the rear wall of the tub 2 has plural ribs 201 formed on the same diameter inwardly or outwardly every predetermined distance from the center thereof to reinforce strength or plural ribs 201 formed along the circumferential direction.

Also, as shown in FIG. 3, the tub 2 is injection-molded. More specifically, an injection-molding material inlet 410 which defines a gate part after molding is formed in a metal mold 400 and an injection part 270 is provided in the mold-injection opening 410 to allow an injection-molding material injected therein, thereby injecting the injection-molding material into the metal mold.

However, the conventional drum washing machine, as shown in FIG. 3, has a problem that the inflow of injection-molding material is not smooth, because the injection direction of the injection-molding material injected through the gate part and the inflow direction for defining a rear wall of the tub 2 are too much perpendicularly bent in injection-molding the rear wall of the tub. Moreover, the conventional drum washing machine has another problem that inferiority of injection-molding may arise in an outer surface of the rear wall of the tub 2 due to the above unsmooth inflow of the injection-molding material.

DISCLOSURE OF INVENTION

Technical Problem

An object of the present invention devised to solve the problem is to provide a tub structure of a washing machine capable of flowing resin smoothly in injection-molding a tub.

Technical Solution

To achieve these objects and other advantages and in accordance with the purpose of the invention, as embodied and broadly described herein, a washing machine having a tub having a front side opened and a rear wall closed and a drum rotatably mounted within the tub, wherein a portion adjacent to a gate part allowing resin injected therein in injection-molding the rear wall of the tub is thicker than the other portions to improve inflow of the resin.

Here, plural ribs are formed on an outer surface of the rear wall of the tub with respect to a rotation shaft of the drum, and the gate part is provided in the rib formed on the rear wall of the tub.

Also, at least two gate parts are formed.

The plural gate parts are provided on the same circumference with respect to the rotation shaft of the drum.

Plural ribs are formed on an inner surface of the rear wall of the tub with respect to the rotation shaft of the drum, and the gate part is formed in the rib formed on the rear wall of the tub.

At least two gate parts are formed.

The plural gate parts are provided on the same circumference with respect to the rotation shaft of the drum.

Advantageous Effects

A drum washing machine according to the present invention has an advantageous effect that resin may be flowing smoothly in injection-molding a tub, because the washing machine includes a spare space.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings.

Figure 4:
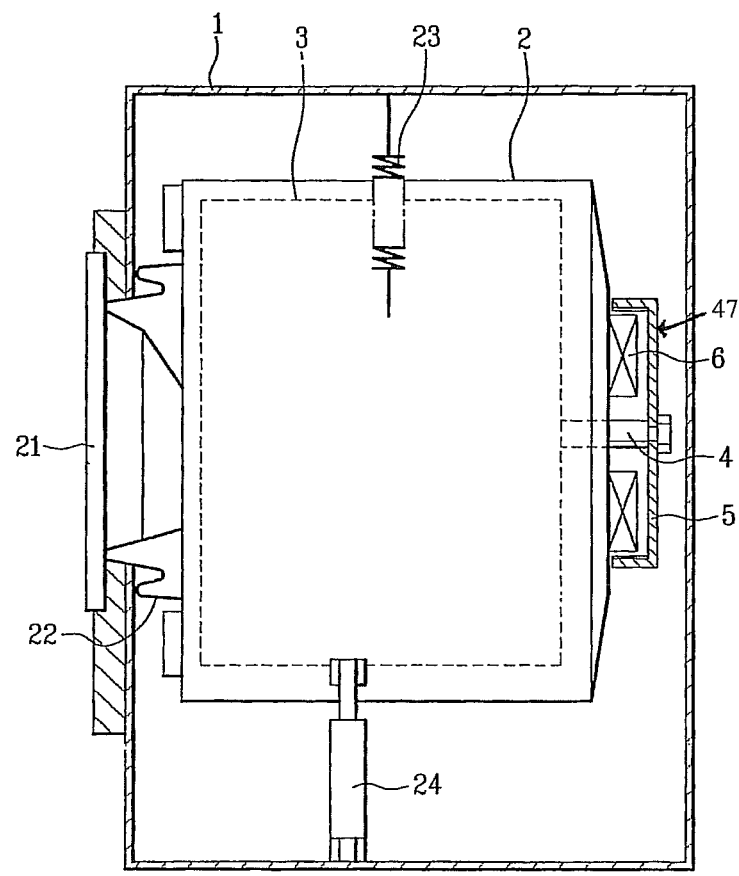
FIG. 4 is a sectional view schematically illustrating key parts of a drum washing machine according to the present invention.
Figure 5:
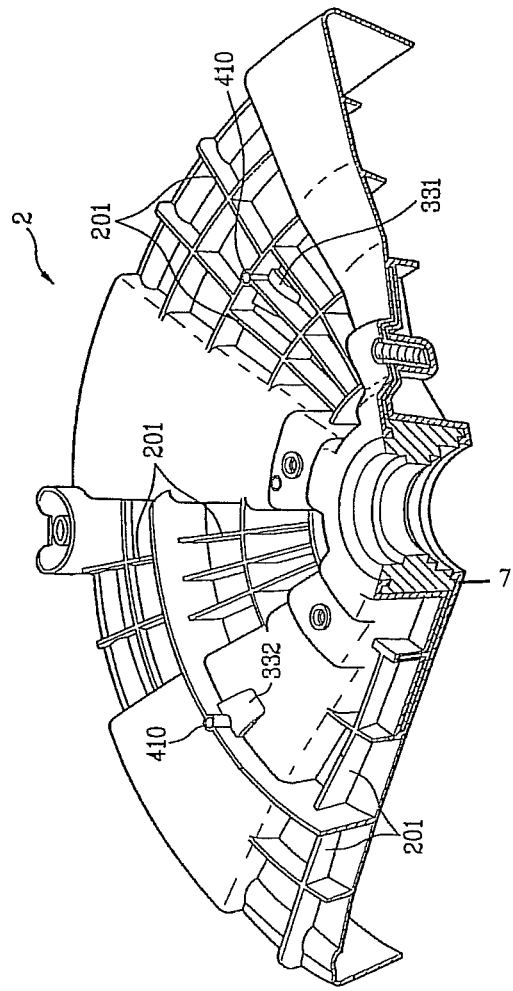
FIG. 5 is a perspective view illustrating a partial structure of a rear wall of a tub according to the drum washing machine of the present invention.
Figure 6:
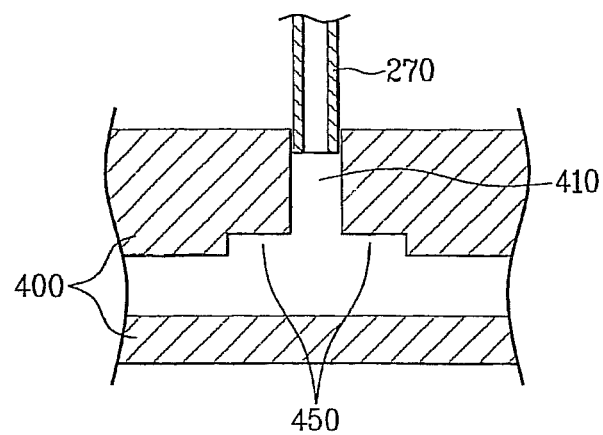
FIG. 6 is a sectional view schematically illustrating a structure in which the injection-molding material is injected into a metal mold to fabricate the tub.

Referring to FIGS. 4 to 6, preferred embodiments of the present invention will be described in detail.

The same components of each embodiment will have the same references and names as follows.

FIG. 4 is a sectional view schematically illustrating key parts of a drum washing machine according to the present invention. FIG. 5 is a perspective view illustrating a partial structure of a rear wall of a tub according to the drum washing machine of the present invention. FIG. 6 is a sectional view schematically illustrating a structure in which the injection-molding material is injected into a metal mold to fabricate the tub.

As shown in FIG. 4, a washing machine according to the present invention includes a cabinet 1 for defining an exterior thereof, a tub 2 mounted within the cabinet 1 to hold wash water therein and having a front side opened and a rear wall closed, a drum 3 rotatably mounted within the tub 2.

Also, a motor 47 is mounted in rear of the tub 2. A stator 6 is secured to the rear wall, and a rotor 5 passes through the tub 2 and is connected with the drum 3 by a shaft with surrounding the stator.

Together with that, a tub supporter in the same appearance as an exterior of the rear wall of the tub 2 is provided between the rear wall of the tub 2 and the stator 6, and fastened to the rear wall of the tub 2 to support the load of the stator 6 when fastening the stator 6. Also, the tub supporter is made of metal to maintain the concentricity of the stator 6.

Meanwhile, a door 21 is coupled to a front side of the cabinet 1, and a gasket 22 is provided between the door 21 and the tub 2.

In addition, a hanging spring 23 is provided between an upper inner surface of the cabinet 1 and an upper circumferential surface of the tub 2 to support the tub 2. Also, a friction damper 24 is provided between an inner lower surface of the cabinet 1 and a lower portion of the outer circumferential surface of the tub 2 to dampen the vibration of tub 2 generated in spinning.

The bearing housing 7 is made of aluminum alloy, such that the bearing housing 7 may be inserted into the rear wall of the tub 2 as one body when injection-molding the tub 2.

As shown in FIG. 5, plural ribs 201 for reinforcing the strength of the rear wall of the tub 2 are formed on the same circumference every distance spaced apart from the center of the rear wall, or along the circumferential direction.

At that time, the rear wall of the tub 2 is injection-molded, such that a gate part 410 allowing resin injected therein is provided in the rear wall of the tub 2.

The gate part 410 is provided in at least two ribs formed on an outer surface of the tub.

Also, a reinforcing part is further provided. The reinforcing part is a portion adjacent to the gate part 410 which is thicker than the other portions by a metal mold having space in order to improve inflow of the resin injected through the gate part 410.

Preferably, the gate part 410 is provided in the rib formed on the rear wall of the tub 2.

Also it is preferred that at least two gate parts are provided, and it is definitely preferred that the gate parts are, in case that plural gate parts are provided, are arranged on the same circumference with respect to the rotation shaft of the drum 3.

Although it is illustrated and described in the drawings and the description that the rib is formed only in the outer surface of the rear wall of the tub 2 and the gate part 410 is provided n the rib, plural ribs (not shown) are formed in the inner surface of the rear wall of the tub. Preferably, a gate part is also provided on the ribs.

The operation according to the embodiments of the present invention having the above configuration will be described.

Injection-molding is a kind of molding method for molding plastic resin and according to the injection-molding plastic resin is heated at the high temperature into melt. Hence, the plastic resin in a melt state is injection-molded into a metal mold through an injection opening such as a piston.

An injection-molding method according to the present invention will be schematically described as follows.

Figure 1:
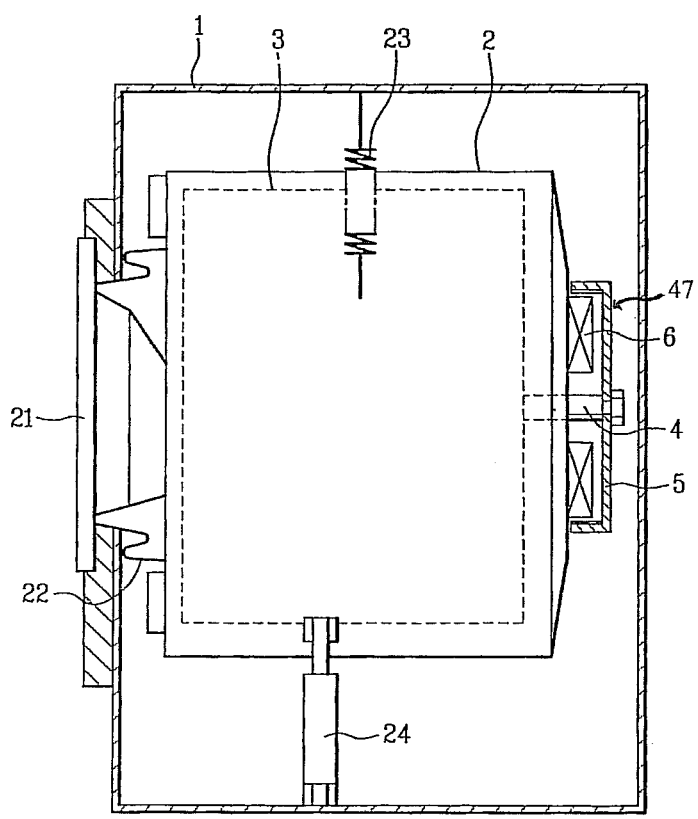
FIG. 1 is a sectional view schematically illustrating key parts of a conventional drum washing machine.
Figure 2:
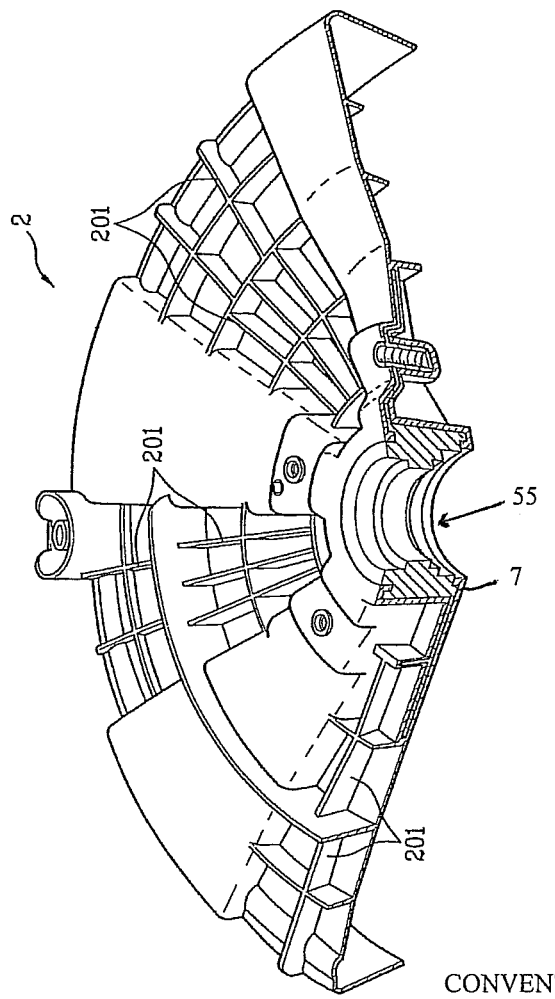
FIG. 2 is a perspective view illustrating a tub of the conventional drum washing machine.
Figure 3:
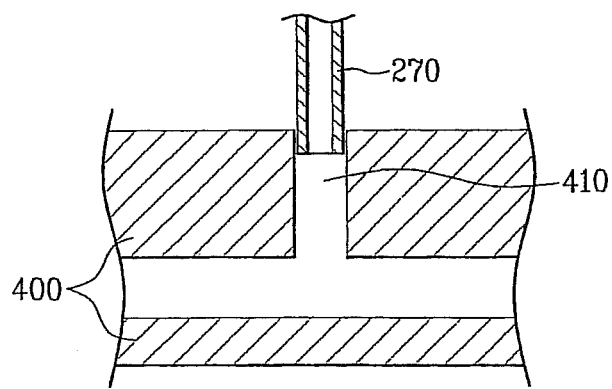
FIG. 3 is a sectional view schematically illustrating a structure where an injection-molding material is injected into a conventional metal mold according to the related art.

First of all, referring to FIG. 3 illustrating the conventional injection-molding method, the portion where molding material is inserted into a metal mold through an injection part 270, that is, the portion adjacent to the gate part 410 has an injection direction and a flowing direction perpendicularly bent at the portion of injection. In that case, the molding material should be flowing to the end of the molding structure in the metal mold. However, the injected resin may not flow to the outer end of the tub 2 smoothly, because the space adjacent to the gate part 410 is narrow.

Thus, as shown in FIG. 6, when a spare space 450 having larger space than other portions is formed in the portion adjacent to the gate part 410 so that the injected resin gathers therein, the resin is filled in the spare space 450 first and then flowing toward the end of the rear wall of the tub 2. Since the flowing direction from the spare space 450 to the outer side of the rear wall of the tub 2 is the same direction, the resin may be flowing smoothly and filled to the end of the rear wall of the tub 2.

As shown in FIG. 5, in case that the rear wall of the tub 2 is completely molded awing to the spare space 450, a reinforcing part 331 and 332 corresponding to the spare space 450 is formed adjacent to the gate part 410.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Since the present invention includes the spare space formed in the metal mold the outlet adjacent to the gate part in injection-molding the rear wall of the tub and the molding material is injected/flowing smoothly, the present invention has an industrial applicability that the rear wall of the tub may be molded safely.

The invention claimed is:

1. A washing machine having a tub having an open front side and a closed rear wall and a drum rotatably mounted within the tub, the rear wall of the tub comprising:
    a circumferential rib formed in an outer surface of the rear wall of the tub;
    at least two gate parts formed after allowing resin to be injected through a first portion of a mold to form the rear wall of tub, the at least two gate parts being disposed at the circumferential rib formed in the outer surface of the rear wall of the tub; and
    a reinforcing part formed adjacent to each of the at least two gate parts, the reinforcing part being formed by a second portion of the mold which has been enlarged to improve inflow of the resin, wherein a thickness of the reinforcing part in an injecting direction of the resin is thicker than portions of the rear wall of the tub disposed immediately adjacent the reinforcing part opposite the respective rib, and wherein the reinforcing part is substantially rectangular in shape and extends from the circumferential rib a predetermined distance inwardly in a radial direction of the rear wall.

2. The washing machine of claim 1, wherein the circumferential rib extends along a circumferential direction of the rear wall of the tub.

3. The washing machine of claim 1, wherein a central longitudinal axis of the reinforcing part extends at a substantially 90° angle to a central longitudinal axis of the respective gate part.

4. The washing machine of claim 1, wherein the reinforcing part is exposed to the outer surface of the rear wall of the tub.

5. The washing machine of claim 1, wherein the reinforcing part projects from the outer surface of the rear wall of the tub.

6. The washing machine of claim 5, wherein a height of the reinforcing part is lower than a height of the circumferential rib.

\* \* \* \* \*